No. 668,076. Patented Feb. 12, 1901.
W. O. WORTH & W. R. DONALDSON.
DETACHABLE TREAD SHOE FOR VEHICLE WHEELS.
(Application filed Apr. 5, 1900.)
(No Model.) 2 Sheets—Sheet 2.
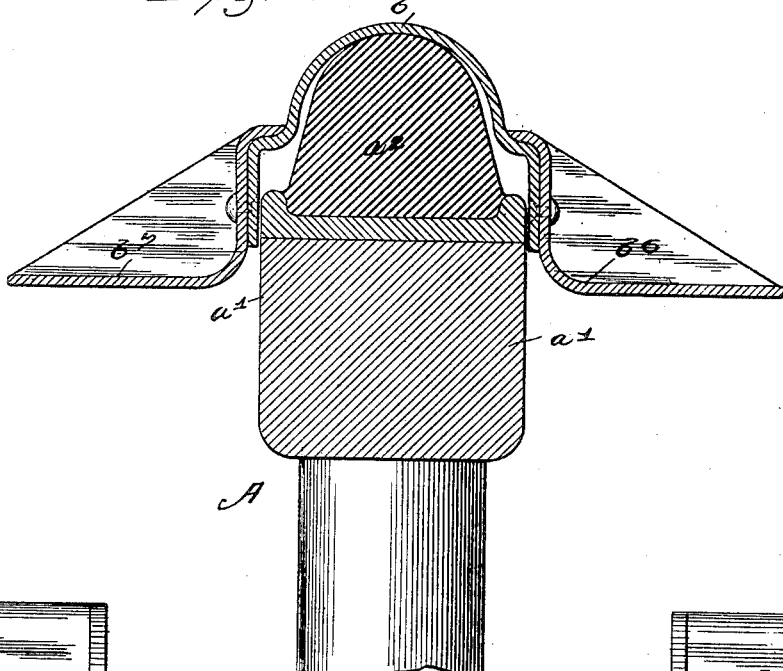
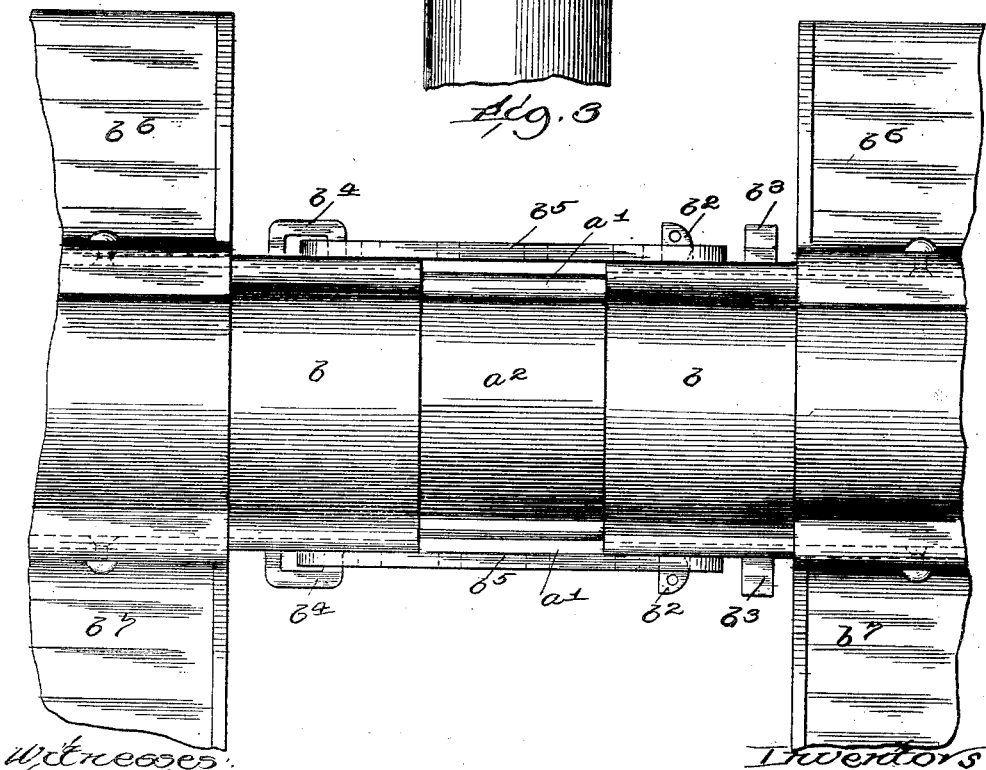
Witnesses: R. White, Harry B. C. White.
Inventors: William O. Worth, William R. Donaldson. By Jones Baine, Attorney.

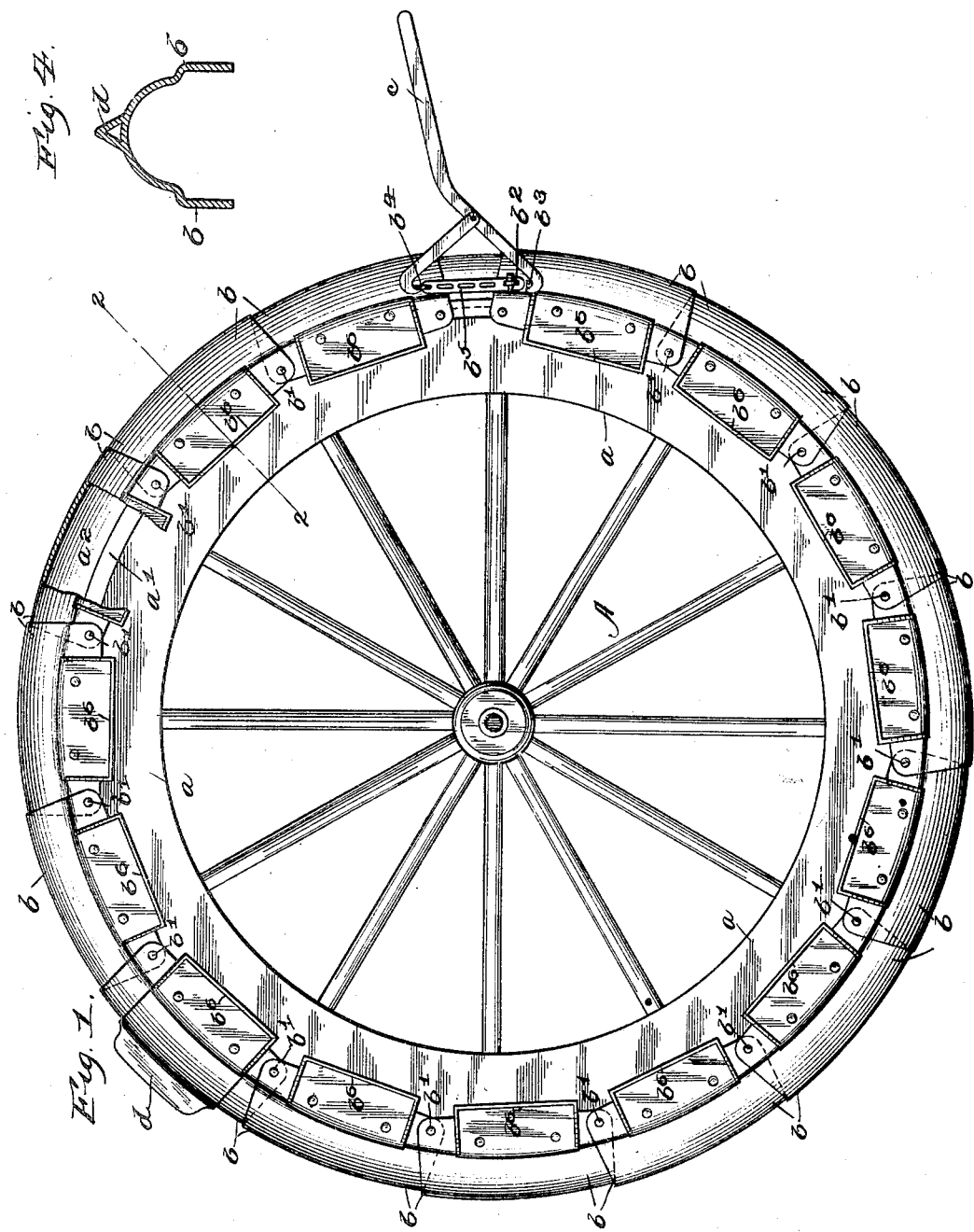

United States Patent Office.

WILLIAM O. WORTH AND WILLIAM R. DONALDSON, OF CHICAGO, ILLINOIS, ASSIGNORS OF ONE-THIRD TO HENRY W. KELLOGG, OF BATTLE CREEK, MICHIGAN.

DETACHABLE TREAD-SHOE FOR VEHICLE-WHEELS.

SPECIFICATION forming part of Letters Patent No. 668,076, dated February 12, 1901.

Application filed April 5, 1900. Serial No. 11,623. (No model.)

*To all whom it may concern:*

Be it known that we, WILLIAM O. WORTH and WILLIAM R. DONALDSON, citizens of the United States, residing at Chicago, county of Cook, and State of Illinois, have invented certain new and useful Improvements in Detachable Tread-Shoes for Vehicle-Wheels; and we do hereby declare the following to be a full, clear, and exact description of the invention, such as will enable persons skilled in the art to which it appertains to make and use the same.

The purpose of our invention is to provide an improved detachable tread for vehicle-wheels that may be applied readily and quickly.

Our invention is especially adapted to that class of vehicles which are propelled by the traction of the rotated wheel with the path over which the vehicle passes.

One object sought is to change the character of contact between the rotating wheel and the path over which it passes in order to increase the frictional coefficient between the two surfaces and to thereby prevent the wheel from being idly revolved without contributing to the progress of the vehicle.

Another object in providing large surfaces on our improved tread is to distribute the weight of the vehicle over a greater area of contact, and thereby prevent the vehicle from sinking deeply into the mud, sand, or snow, as the case may be.

A further object we have in view is to attach our tread-shoes to the tire, so that the resilience of the tire is retained and remains unimpaired for the purpose for which it is intended.

Our device also forms a flexible shield for the tire, whereby the tire, if of the pneumatic variety, is absolutely protected against possibility of puncture and when cushion-tires are used they are preserved from excessive wear.

In the drawings, Figure 1 is an elevation of a vehicle-wheel, showing our detachable tread device when being applied to a wheel. One of the shoes is shown in section. Fig. 2 is an enlarged section taken through the wheel and one of the shoes on line 2 2 of Fig. 1. Fig. 3 is an approximately full-sized plan view showing the means for fastening the chain of shoes after they have been applied to the wheel. Fig. 4 shows an end-thrust attachment for the front wheels.

In all of the views like letters are used to indicate similar parts.

A is a wheel. $a$ is the rim or felly. $a'$ is the iron tire, and $a^2$ is the rubber cushion-tire.

Our device consists of a series of U-shaped metal shoes $b$, hinged together at $b'$ in such a manner that the end of one shoe telescopes into the end of the next succeeding one until a chain of shoes sufficient in number to almost completely surround the wheel has been formed. The ends of the chain thus formed are attached together, as shown in Figs. 1 and 2.

It will be noticed that the shoe $b$ is made to bear directly upon the tread of the resilient tire $a^2$, so that the shoe will move vertically with the tire when the pressure comes on them in succession, and for this reason the desirable qualities of the tire are preserved.

Without our shoe the weight on the tire when traveling over an absolutely plane surface is borne theoretically on a point; but when our shoe is used the weight is sustained by the rubber tire over the entire interior bottom of the shoe.

In Figs. 1 and 3 we have shown one means by which our chain of shoes may be fastened and retained upon the wheel. The terminal shoes are provided with lugs $b^2$ $b^2$ $b^3$ $b^3$ and staples $b^4$ $b^4$. The latter retain the link-bars $b^5$ $b^5$ loosely in place when the chain is not in use. The link-bars $b^5$ are each provided with a series of perforations, into either of which the lugs $b^2$ may be inserted for the purpose of adjusting the tension of the chain around the wheel. A double cant-hook $c$ is caused to span the open space between the lugs $b^2$ and the staples $b^4$, which answer a similar purpose for tightening the chain around the wheel. Laterally-extending wings $b^6$ and $b^7$ are attached to either side of the shoe $b$ and form extended tread-surfaces, which as a whole are of smaller diameter than the original tread of the wheel. These surfaces are to prevent the wheel from sinking deeply into the yielding roadway, as hereinbefore described. These surfaces are shown riveted to the main shoe part *b*; but they may just as well be attached with screws or in any other convenient manner, whereby they may be readily removed, when desired, before or after the chain has been applied to the wheel. These surfaces prevent the wheel from cutting into the soft roadway; but they may be left on the wheel when traveling over a smooth hard roadway without interfering with the operation of the wheel, because these surfaces occupy a position of smaller diameter with reference to the diameter of the true traction-surfaces, and for that reason their function is not brought into service until the wheel sinks into the roadway deep enough to bring them into contact with the upper surface of the roadway.

In Fig. 4 we have shown an end-thrust plate *d*, which may be attached to all or a part of the number of shoes that form the chain of shoes in our device. We prefer to attach the plate *d* to the front or steering wheels of the vehicle. The object of the plate is to prevent the wheels from sliding endwise when they are deflected for the purpose of changing the direction of the vehicle.

Having described our invention, what we claim as new, and desire to secure by Letters Patent of the United States, is—

1. A tread for a vehicle-wheel comprising a series of shoes hinged together, for surrounding a wheel, and a means for holding the said series of shoes in intimate contact with the circumference of the said wheel, substantially as set forth.

2. A tread for a vehicle-wheel comprising a series of flexibly-joined shoes, for surrounding a wheel, a means for holding the said series of shoes in intimate contact with the circumference of the said wheel, and a series of laterally-extending wings, or plates, on either side of said shoes, substantially as set forth.

3. A tread for a vehicle-wheel comprising a series of flexibly-joined shoes, for surrounding a wheel, a means for holding the said series of shoes in intimate contact with the circumference of the said wheel, and pieces removably fixed to the said shoes for increasing the traction-power of the said wheel, substantially as set forth.

4. A tread for a vehicle-wheel comprising a tractive surface at the extreme diameter of the wheel and a laterally-extending tractive surface of smaller diameter, intermediate of the first tractive surface and the center of the said wheel, substantially as set forth.

5. A tread for a vehicle-wheel comprising a series of flexibly-joined shoes surrounding a wheel, a means for holding said shoes in intimate contact with the said wheel, and a thrust-plate *d* extending outwardly from said shoe, substantially as set forth.

In testimony whereof we have signed this specification, in the presence of two subscribing witnesses, this 28th day of March, 1900.

WILLIAM O. WORTH.
WILLIAM R. DONALDSON.

Witnesses:
FORÉE BAIN,
M. F. ALLEN.